(12) United States Patent
Gordon et al.

(10) Patent No.: US 9,511,829 B2
(45) Date of Patent: Dec. 6, 2016

(54) METHODS AND SYSTEMS FOR TRACKING A TOOLSTRING AT SUBSEA DEPTHS

(71) Applicant: Halliburton Energy Services, Inc., Houston, TX (US)

(72) Inventors: Scott A. Gordon, Frisco, TX (US); David Russ Larimore, Dallas, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 120 days.

(21) Appl. No.: 14/401,666

(22) PCT Filed: Sep. 19, 2012

(86) PCT No.: PCT/US2012/055999
§ 371 (c)(1),
(2) Date: Nov. 17, 2014

(87) PCT Pub. No.: WO2014/046647
PCT Pub. Date: Mar. 27, 2014

(65) Prior Publication Data
US 2015/0116123 A1    Apr. 30, 2015

(51) Int. Cl.
*E21B 47/09* (2012.01)
*B63C 11/48* (2006.01)
*G01S 5/18* (2006.01)
*E21B 43/01* (2006.01)
*B63G 8/00* (2006.01)

(52) U.S. Cl.
CPC ............. *B63C 11/48* (2013.01); *E21B 43/01* (2013.01); *G01S 5/18* (2013.01); *B63G 2008/007* (2013.01)

(58) Field of Classification Search
CPC ........ E21B 47/12; E21B 47/122; E21B 47/16; E21B 47/09; E21B 33/0355
USPC ..................... 340/853.2, 853.3, 853.6, 854.1
See application file for complete search history.

(56) References Cited

U.S. PATENT DOCUMENTS

| | | | |
|---|---|---|---|
| 6,463,801 B1 * | 10/2002 | Young | E02D 1/04 73/170.32 |
| 7,261,162 B2 | 8/2007 | Deans et al. | |
| 7,891,429 B2 | 2/2011 | Boyce et al. | |
| 2008/0048881 A1 * | 2/2008 | Safinya | G01S 5/28 340/852 |
| 2009/0288835 A1 * | 11/2009 | Sbordone | E21B 47/04 166/336 |
| 2012/0000663 A1 | 1/2012 | Mebarkia et al. | |
| 2012/0145407 A1 | 6/2012 | Varley et al. | |
| 2012/0193104 A1 | 8/2012 | Hoffman et al. | |

OTHER PUBLICATIONS

International Search Report and Written Opinion for PCT/US2012/055999 dated Apr. 29, 2013.

* cited by examiner

Primary Examiner — Kevin Kim
(74) Attorney, Agent, or Firm — McDermott Will & Emery LLP; Scott Richardson

(57) ABSTRACT

Disclosed are methods and systems for tracking a toolstring at subsea depths. One system includes a remote operated vehicle (ROV), a wireless transmitter arranged on the toolstring and configured to transmit one or more wireless signals, a wireless receiver configured to perceive the one or more wireless signals, whereby the ROV is able to locate a position of the toolstring in the oceanic environment.

24 Claims, 1 Drawing Sheet

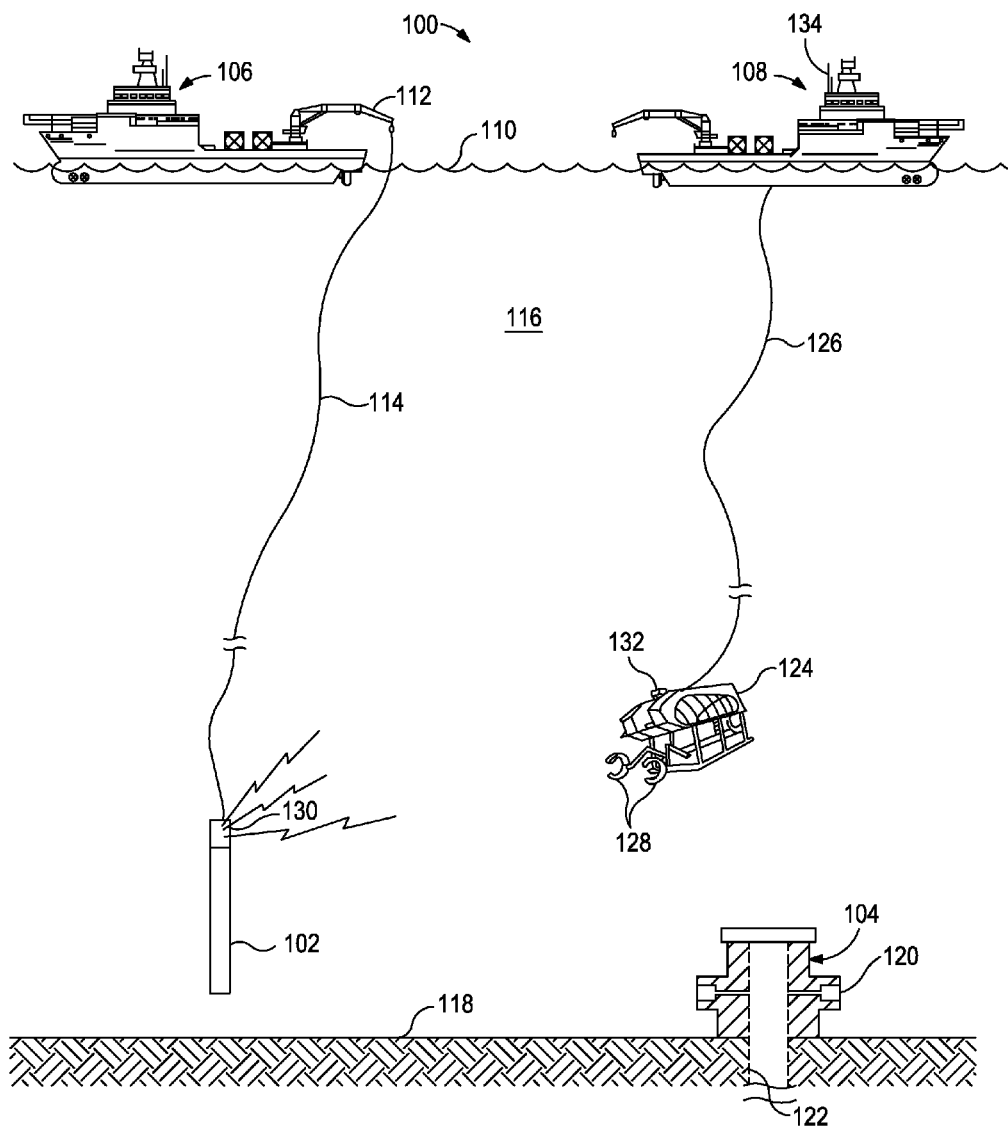

METHODS AND SYSTEMS FOR TRACKING A TOOLSTRING AT SUBSEA DEPTHS

BACKGROUND

The present invention relates to subsea wellbore intervention operations and, in particular, to methods and systems for tracking a toolstring at subsea depths.

In the oil and gas industry, subsea operations include systems used to explore, drill, harvest, and/or maintain subterranean hydrocarbon formations located under the ocean floor. Access to the subterranean formations is usually via one or more wellhead installations arranged on the seabed and providing access to a corresponding wellbore drilling into the subterranean formation. Equipment used in subsea operations is generally constructed to withstand extreme conditions, be economically cost-effective, and safe guard the oceanic environment. Conventional systems used in subsea operations include a service vessel or rig located at the surface and from which a toolstring is lowered to the seabed in order to undertake one or more intervention operations on the wellhead installation. The toolstring is usually brought into proximity of the wellhead installation using a remote operated vehicle (ROV) remotely operated from a support vessel also located at the surface. The ROV is usually tethered to the support vessel and an operator residing on the support vessel is able to navigate or otherwise manipulate the general position of the ROV in the open water.

In typical operation, the ROV is brought to the surface and is attached to the toolstring in order to transport the toolstring from the surface and to the wellhead installation. Some ROVs use a light source in order to see the toolstring. In this regard, the toolstring is typically painted black which improves light reflection in the subsea environment. Once arriving at the wellhead, the ROV can be controlled to have the toolstring perform repair and intervention tasks on the wellhead or otherwise stab the toolstring into the wellhead for downhole operations. Once the intended subsea operation is completed, the ROV typically transports or otherwise follows the toolstring back up to the ocean surface where a tool changeout can occur on the toolstring. Once the toolstring is again ready to be introduced into the subsea environment, the ROV is again attached thereto and the diving and locating process is repeated.

Accordingly, the ROV must typically dive and surface with the toolstring each time a new tool or tool changeout is required on the toolstring. This drastically increases the time required to perform the intended subsea operations, thereby increasing the related costs of operating the surface equipment (i.e., the service rig, the support vessel, etc.). To reduce operation time, some systems include a carousel of tools arranged on the toolstring so that the ROV can undertake a variety of subsea operations and interventions from a single trip to the wellhead. However, if the scope of subsea operations changes, the carousel of tools must surface along with the ROV operating therewith as previously discussed.

In current systems, toolstring turnaround times for subsea operations are limited by the speed of the ROV. For example, while toolstrings can be deployed in subsea operations at a line speed of 200-300 ft/min, the speed at which an ROV can dive with the toolstring is about 75 ft/min. As a result, the ROV is the weak link of the operation in terms of time consumption. Accordingly, there is a need in the art to more quickly and efficiently perform subsea operations such as by eliminating the need for the ROV to dive and surface with the toolstring. Moreover, there is a need in the art for a system which detects the location of a toolstring while at subsea depths.

SUMMARY OF THE INVENTION

The present invention relates to subsea wellbore intervention operations and, in particular, to methods and systems for tracking a toolstring at subsea depths.

In one aspect of the disclosure, a system for locating a toolstring in an oceanic environment is disclosed. The system may include a wireless transmitter arranged on the toolstring and configured to transmit one or more wireless signals, and a wireless receiver configured to perceive the one or more wireless signals, whereby a remote operated vehicle (ROV) is able to locate a position of the toolstring in the oceanic environment.

In another aspect of the disclosure, a method of locating a toolstring in an oceanic environment is disclosed. The method may include introducing the toolstring into the oceanic environment, the toolstring having a wireless transmitter arranged thereon, emitting one or more wireless signals from the wireless transmitter, perceiving the one or more wireless signals with a wireless receiver, and determining a location of the toolstring in the oceanic environment based on the one or more wireless signals.

In yet other aspects of the disclosure, a method of locating a toolstring at a wellhead installation disposed in an oceanic environment is disclosed. The method may include introducing the toolstring into the oceanic environment, the toolstring having a wireless transmitter arranged thereon, introducing a remote operated vehicle (ROV) into the oceanic environment, emitting one or more wireless signals from the wireless transmitter, perceiving the one or more wireless signals with a wireless receiver, determining a location of the toolstring in the oceanic environment based on the one or more wireless signals, navigating the ROV to the location of the toolstring based on the one or more wireless signals, capturing the toolstring with the ROV, and transporting the toolstring with the ROV to the wellhead installation.

The features and advantages of the present invention will be readily apparent to those skilled in the art upon a reading of the description of the preferred embodiments that follows.

BRIEF DESCRIPTION OF THE DRAWINGS

The following FIGURE is included to illustrate certain aspects of the present invention, and should not be viewed as an exclusive embodiment. The subject matter disclosed is capable of considerable modifications, alterations, combinations, and equivalents in form and function, as will occur to those skilled in the art and having the benefit of this disclosure.

FIG. 1 illustrates an exemplary system for delivering a toolstring to a wellhead installation, according to one or more embodiments.

DETAILED DESCRIPTION

The present invention relates to subsea wellbore intervention operations and, in particular, to methods and systems for tracking a toolstring at subsea depths.

The disclosed systems and methods may prove advantageous in allowing a subsea remote operated vehicle (ROV) to accurately locate a toolstring conveyed from the surface into the ocean and bring the toolstring to a subsea wellhead installation for undertaking various subsea operations. According to one aspect of the disclosure, a transmitter or beacon may be arranged on the toolstring. The transmitter may be configured to transmit a signal or otherwise communicate with a corresponding receiver device arranged on the ROV. The received signal allows the ROV to accurately locate the toolstring at subsea depths. Once the subsea operation is completed, or the toolstring otherwise requires a changeout, the toolstring may be retracted to the surface independently, while the ROV remains at depth. As a result, turnaround times for the toolstring changeout is drastically reduced as being dependent on the speed of the toolstring conveyance and not on the speed of the ROV. Another advantage gained by the disclosed systems and methods is that the toolstring may be monitored in real-time from the surface (e.g., via communication with the ROV) to both locate the toolstring and determine how the toolstring reacts in various ocean current profiles.

Referring to FIG. 1, illustrated is an exemplary system 100 for delivering a toolstring 102 to a wellhead installation 104, according to one or more embodiments. As illustrated, the system 100 may include a service vessel 106 and a support vessel 108 located at the ocean surface 110. The service vessel 106 may include a boom 112 configured to convey a deployment wireline 114 into the oceanic environment 116. In some embodiments, the deployment wireline 114 may be slickline, as known to those skilled in the art. In other embodiments, the deployment wireline 114 may include, but is not limited to, electrical wire or wireline (e.g., braided or mono-conducted), steel wire rope, fiber optics, coil tubing, pipe, an electrical-hydraulic umbilical, combinations thereof, and the like. The deployment wireline 114 may be either autonomous or remote controlled.

The deployment wireline 114 may be configured to convey the toolstring 102 into the oceanic environment 116 until it reaches a predetermined depth. The toolstring 102 can include any number of wellbore operation tools attached thereto, as generally known to those skilled in the art. For instance, the toolstring 102 may include such tools and equipment as, but not limited to, traditional mechanical flow control devices, reservoir monitoring tools, perforating tools, zonal isolation tools, gas lift and circulating device tools, pulling and running tools, camera, combinations thereof, and the like.

The wellhead installation 104, also known as a subsea tree, may be installed on the seabed 118 and include one or more blowout preventers 120. As known in the art, the wellhead installation 104 may provide a point of fluid communication to a wellbore 122 that extends downward from the seabed 118 and into the Earth's crust. While not shown, the wellhead installation 104 may also include an assembly of valves, spools, and fittings to control the flow of fluids into or out of the wellbore 122. The wellhead installation 104 may further include additional structures, including chemical injection points, well intervention means, pressure relief means, and wellbore monitoring points, as generally known to those skilled in the art. General maintenance of the wellbore 122 and the wellhead installation 104 depends on the ability to accurately locate the toolstring 102 at the wellhead installation 104.

To accomplish this, the system 100 may further include an ROV 124. As illustrated, in at least one embodiment, the ROV 124 may be tethered to the support vessel 108 located at the surface 110 via an umbilical 126. The umbilical 126 may be armored or unarmored cable containing electrical and/or hydraulic conduit capable of facilitating communication between the ROV 124 and the support vessel 108, such that an operator residing on the support vessel 108 is able to operationally control (e.g., underwater movement, positioning, etc.) the ROV 124, thereby being able to manipulate the position of the ROV 124 within the oceanic environment 116. In other embodiments, however, the umbilical 126 may be omitted and the ROV 124 may instead be configured to wirelessly communicate with the support vessel 108 through conventional wireless means, whereby the operator on the support vessel 108 is equally able to navigate the position of the ROV 124.

In some embodiments, the support vessel 108 can include a controller (e.g., a computer including a machine-readable medium) thereon which receives and processes the signals transmitted by the ROV 124. Such signals may provide data relating to the subsea operation, operating/diagnostic conditions of the ROV 124, the real-time location of the ROV 124 within the oceanic environment 116, etc. Moreover, the controller may be configured to transmit signals back to the ROV 124 via the umbilical 126 to, for example, control movement of the ROV 124 and facilitate the subsea operations at the wellhead installation 104. The umbilical 126 thus provides bidirectional communication between the ROV 124 and the support vessel 108, whereby there is provided a means to remotely control the ROV 124 during subsea operations while simultaneously obtaining feedback data from the ROV 124.

The ROV 124 can be equipped with on-board propulsion systems, navigation systems, communication systems, video systems, lights, and mechanical manipulators 128 so that the ROV 124 is able to be navigated to the toolstring 102 upon request and thereafter transport the toolstring 102 to the wellhead installation 104 to undertake a particular subsea operation. For example, after the ROV 124 is lowered to a subsurface position or depth within the oceanic environment 116, the operator on the support vessel 108 may be able to utilize the on-board navigation and communications systems arranged on the ROV 124 in order to "fly" the ROV 124 to a desired destination (i.e., proximity of the toolstring 102, the wellhead installation 104, etc.) in the oceanic environment 116. The operator or pilot can then operate the mechanical manipulators 128 in order to facilitate the commencement of various subsea operations.

In one or more embodiments, a beacon or wireless transmitter 130 may be arranged on the toolstring 102 and a corresponding wireless receiver 132 may be arranged on the ROV 124. In other embodiments, a wireless receiver 134 may also be arranged on the support vessel 108 at the surface 110. The wireless transmitter 130 may be configured to communicate with one or both of the wireless receivers 132, 134 in order to accurately pinpoint the real-time location of the toolstring 102 in the oceanic environment 116. In one or more embodiments, the wireless transmitter 130 may operate on the principles of acoustic communication, such as with an acoustic beacon or the like, and the wireless receivers 132, 134 may be configured to perceive or otherwise recognize and identify such signals or communications.

In other embodiments, however, any type of wireless telecommunication technology and related devices may be used, without departing from the scope of the disclosure. For example, the wireless transmitter 130 may include or otherwise use, but is not limited to, sonar (e.g., ultra short baseline, long baseline, short basic line), radio frequency, acoustic energy, global positioning systems, lasers, combinations thereof, and the like. In some embodiments, the wireless transmitter 130 may be configured to emit one or more wireless signals in the form of electromagnetic radiation which includes, but is not limited to, radio waves, microwave radiation, infrared and near-infrared radiation, visible light, ultraviolet light, X-ray radiation and gamma ray radiation.

In operation, the wireless receiver(s) 132, 134 may be configured to receive the signal from the wireless transmitter 130 to determine the real-time location of the toolstring 102 relative to the wireless receiver(s) 132, 134. The operator residing on the support vessel 108 may then be able to guide the ROV 124 to the exact location of the toolstring 102 using the wireless transmitter 130 as a type of tracking device. As previously discussed, control of the ROV 124 can be through the umbilical 126 which can provide a data communications conduit for transmitting signals between the ROV 124 and the support vessel 108. Alternatively, if communication through the umbilical 126 is cut off for any reason, the ROV 124 can utilize the on-board navigation and wireless communications systems to independently guide itself to the location of the toolstring 102, while simultaneously communicating directly with the wireless transmitter 130.

Upon locating the toolstring 102 at depth, the ROV 124 may then be configured to seize or otherwise capture the toolstring 102 with its mechanical manipulators 128 and guide the toolstring 102 to the wellhead installation 104. At the wellhead installation 104, the ROV 124 may be configured to manipulate the toolstring 102 such that it is able to perform various subsea operations, such as repairs or intervention tasks on the wellhead installation 104. In some embodiments, the ROV 124 may be configured to stab the toolstring 102 into the wellhead installation 104 for various downhole operations known to those skilled in the art. To accomplish this, the toolstring 102 may be connectable to the wellhead installation 104 via a male-female engagement; a connector receptacle of the wellhead installation 104 being the female counterpart and a stinger of the toolstring 102 being the male counterpart.

Accordingly, by arranging the transmitter 130 on the toolstring 102, the ROV 124 may be able to accurately locate the toolstring 102 once the toolstring 102 is conveyed to the predetermined depth in the oceanic environment 116. As a result, the ROV 124 is not required to accompany or otherwise carry the toolstring 102 to and from the service vessel 106, which would otherwise limit the conveyance speed of the toolstring 102 to the slower speed of the ROV 124. Instead, when the toolstring 102 is required to return to the surface 110, such as when a tool changeout is required or after the completion of a particular subsea operation, the ROV 124 may remain at depth while toolstring 102 is retracted unaccompanied back to the service vessel 106. As a result, the toolstring 102 is conveyed at a speed dependent solely on the speed of the deployment wireline 114.

Those skilled in the art will readily recognize the several advantages the exemplary system 100 provides. For example, the disclosed system 100 allows subsea operations to be performed significantly faster as compared to prior systems which required the ROV 124 to surface and dive concurrently with the toolstring 102, therefore increasing turnaround times. Moreover, with unpredictable oceanic currents, sometimes a toolstring 102 inadvertently floats off of target and the ROV 124 would otherwise have a difficult time locating the toolstring 102, thereby wasting additional valuable time. Via the disclosed wireless telecommunication systems as employed on the toolstring 102 and the ROV 124, however, the exemplary system 100 provides a means of accurately locating the toolstring 102 in real-time.

In addition, by tracking the location and movement of the toolstring 102 at subsea depths, data regarding oceanic current profiles at the subsea depth can be obtained. By monitoring reactions of the toolstring 102 to the oceanic current profile using the data and the determined location of the toolstring 102, one or more properties of the toolstring 102 may be obtained. Such properties can be used to improve the manufacture and design of toolstrings 102, and also aid in improving depth control and toolstring 102 deployment methodology or media. As a result, the toolstring 102 becomes better adaptable to various or common oceanic current profiles that may be encountered while performing necessary and intended well services.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A system, comprising:
   a toolstring suspended and floating within an oceanic environment;
   a wireless transmitter arranged on the toolstring and configured to transmit one or more wireless signals; and
   a wireless receiver configured to perceive the one or more wireless signals, whereby a remote operated vehicle (ROV) is able to locate a position of the toolstring in the oceanic environment.

2. The system of claim 1, wherein the wireless receiver is arranged on the ROV, the ROV being able to locate the position of the toolstring in the oceanic environment based on the one or more wireless signals.

3. The system of claim 1, wherein the wireless receiver is arranged on a support vessel located at a surface and communicably coupled to the ROV, the support vessel being able to control the position of the ROV and locate the position of the toolstring in the oceanic environment based on the one or more wireless signals.

4. The system of claim 3, wherein the support vessel is communicably coupled to the ROV via an umbilical, the support vessel being configured to control the ROV via communication through the umbilical.

5. The system of claim 3, wherein the support vessel is communicably coupled to the ROV via wireless telecommunications, the support vessel being configured to wirelessly control the ROV.

6. The system of claim 1, further comprising a service vessel located at a surface to deploy and suspend the toolstring in the oceanic environment via a deployment wireline.

7. The system of claim 6, wherein the deployment wireline is one of slickline, electrical wire, wireline, steel wire rope, fiber optics, coil tubing, pipe, an electrical-hydraulic umbilical.

8. The system of claim 1, wherein the one or more wireless signals are acoustic signals.

9. The system of claim 1, wherein the one or more wireless signals are electromagnetic radiation signals.

10. A method, comprising:
deploying a toolstring into an oceanic environment such that the toolstring floats within the oceanic environment;
emitting one or more wireless signals from a wireless transmitter included on the toolstring;
perceiving the one or more wireless signals with a wireless receiver; and
determining a location of the toolstring in the oceanic environment based on the one or more wireless signals.

11. The method of claim 10, wherein the wireless receiver is arranged on a remote operated vehicle (ROV).

12. The method of claim 11, further comprising navigating the ROV to the toolstring based on the one or more wireless signals.

13. The method of claim 10, wherein the wireless receiver is arranged on a support vessel located at a surface and communicably coupled to an ROV, the method further comprising controlling the position of the ROV with the support vessel based on the one or more wireless signals perceived by the wireless receiver.

14. The method of claim 10, wherein deploying the toolstring into the oceanic environment further comprises deploying the toolstring into the oceanic environment from a service vessel located at a surface.

15. The method of claim 14, further comprising conveying the toolstring into the oceanic environment via a deployment wireline.

16. The method of claim 10, wherein emitting the one or more wireless signals from the wireless transmitter further comprises emitting one or more acoustic signals.

17. The method of claim 10, wherein emitting the one or more wireless signals from the wireless transmitter further comprises emitting one or more electromagnetic radiation signals.

18. The method of claim 10, further comprising:
monitoring a reaction of the toolstring to an oceanic current profile using the one or more wireless signals; and
determining a toolstring property based on the reaction of the toolstring to the oceanic current profile.

19. A method, comprising:
deploying a toolstring into an oceanic environment such that the toolstring floats within the oceanic environment;
introducing a remote operated vehicle (ROV) into the oceanic environment;
emitting one or more wireless signals from a wireless transmitter included on the toolstring;
perceiving the one or more wireless signals with a wireless receiver;
determining a location of the toolstring in the oceanic environment based on the one or more wireless signals;
navigating the ROV to the location of the toolstring based on the one or more wireless signals;
capturing the toolstring with the ROV; and
transporting the toolstring with the ROV to a wellhead installation.

20. The method of claim 19, wherein the wireless receiver is arranged on the ROV.

21. The method of claim 19, wherein the wireless receiver is arranged on a support vessel located at a surface and communicably coupled to the ROV, the method further comprising controlling the position of the ROV with the support vessel based on the one or more wireless signals perceived by the wireless receiver.

22. The method of claim 19, wherein emitting the one or more wireless signals from the wireless transmitter further comprises emitting one or more acoustic signals or one or more electromagnetic radiation signals.

23. The method of claim 19, further comprising:
monitoring a reaction of the toolstring to an oceanic current profile using the one or more wireless signals; and
determining a toolstring property based on the reaction of the toolstring to the oceanic current profile.

24. The method of claim 19, further comprising resurfacing the toolstring from the oceanic environment while the ROV remains at depth.

* * * * *